United States Patent [19]

Wallace

[11] Patent Number: 4,847,113

[45] Date of Patent: Jul. 11, 1989

[54] THREAD LOCK

[75] Inventor: Richard B. Wallace, Bloomfield Hill, Mich.

[73] Assignee: The Oakland Corporation, Troy, Mich.

[21] Appl. No.: 160,677

[22] Filed: Feb. 26, 1988

[51] Int. Cl.$^4$ ............................................... B05D 3/06
[52] U.S. Cl. ................................... 427/54.1; 427/287
[58] Field of Search ................. 427/54.1, 388.1, 409, 427/287

[56] References Cited

U.S. PATENT DOCUMENTS

| | | | |
|---|---|---|---|
| 3,746,068 | 7/1973 | Deckert et al. | 427/386 |
| 4,091,122 | 5/1978 | Davis et al. | 427/152 |
| 4,228,216 | 10/1980 | Austin et al. | 427/150 |
| 4,258,378 | 8/1981 | Wallace | 427/195 |
| 4,366,190 | 12/1982 | Rodden et al. | 427/195 |
| 4,484,204 | 11/1984 | Yamamoto et al. | 427/150 |

Primary Examiner—Janyce Bell
Attorney, Agent, or Firm—Barnes, Kisselle, Raisch, Choate, Whittemore & Hulbert

[57] ABSTRACT

The method of making a friction locking fastener of the type having in the thread grooves a first deposit formed of a mixture of an uncured epoxy resin and a radiation-curable, film-forming material, and a second deposit of a fluid curing agent and a radiation-curable, film-forming material. The deposits are made in the thread grooves at circumferentially spaced locations so that a very thin coating of the radiation-curable, film-forming material develops at the surface of each deposit. The deposits are subjected to high intensity ultraviolet radiation for a few seconds to transform the coatings developed on the surfaces of the deposits into thin, continuous, flexible, non-tacky protective films which cover the still fluid deposits in the thread grooves of the article. Alternatively, when one or both the resin and the curing agent are microencapsulated. They may be contained in a single mixture which includes the radiation-curable material. That mixture, when deposited and exposed to radiation, will form a protective film at the surface. The resin will not be polymerized until the capsule are ruptured.

17 Claims, 1 Drawing Sheet

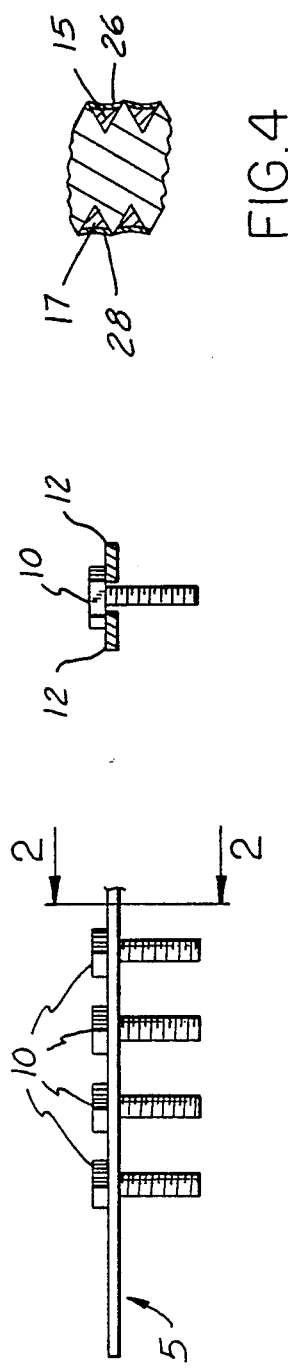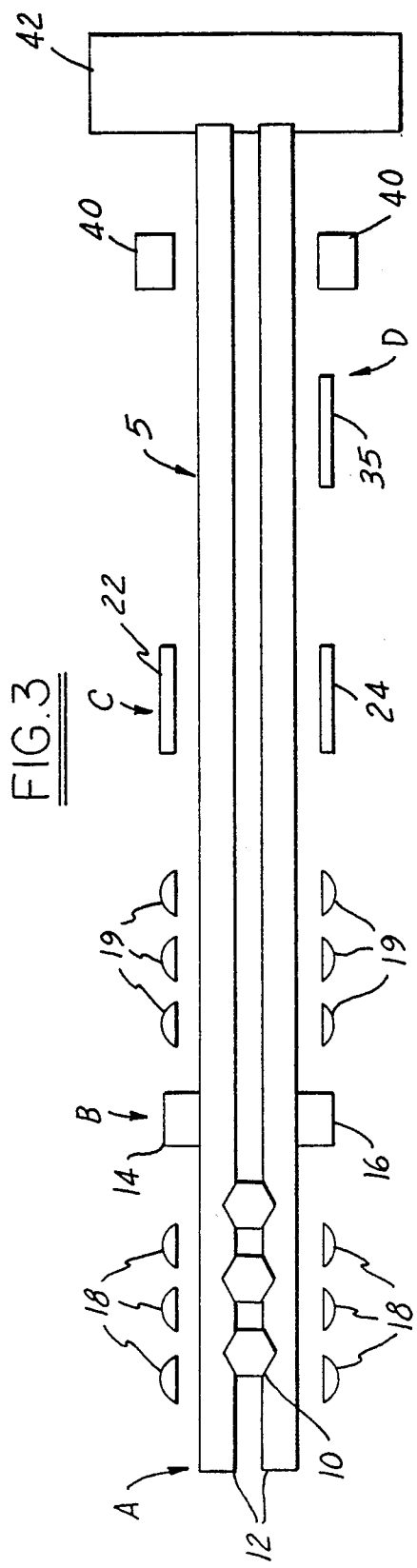

THREAD LOCK

This invention relates generally to a threaded member having a thread locking material applied to the threads to oppose separation when engaged with another threaded member, and refers more particularly to a method of providing a protective coating over the thread locking material prior to engagement.

BACKGROUND AND SUMMARY OF THE INVENTION

Self-locking threaded fasteners have in the past been made by means of a two-part adhesive, such as an uncured epoxy resin and a polymerizing agent. Deposits of the uncured resin and curing agent are applied to the threads of the fastener. The deposits become mixed when the fastener is engaged with a mating member, effecting a cure of the resin to provide a thread lock. The resin has also been micro-encapsulated and the microcapsules mixed with the polymerizing agent to provide a slurry which is applied to the threads. U.S. Pat. No. 3,746,068 discusses micro-encapsulation.

Protection films over the deposits protect them until the time when the fastener is actually engaged with a mating threaded member. Each deposit may be coated with polyvinyl alcohol in a water solution to form the protective film. My prior U.S. Pat. Nos. 4,059,136 and 4,081,012 are of interest in this regard. My prior U.S. Pat. No. 4,325,985 discloses an improvement in which the deposits are coated with ultraviolet curable, protective films. Other patents of interest are U.S. Pat. Nos. 3,489,599, 3,746,068 and 3,814,156.

The present invention is a further improvement in which ultraviolet curable material, rather than being applied as a subsequent coating, is mixed with the resin and curing agent prior to the deposit thereof on the threads of the fastener. That portion of the ultraviolet curable material which is near the surface of the deposits is then cured by ultraviolet light to form a protective skin or film.

These and other objects of the invention will become more apparent as the following description proceeds, especially when considered with the accompanying drawings.

BRIEF DESCRIPTION OF THE DRAWINGS

FIG. 1 is a side elevational view of a twin belt conveyor which is part of apparatus that may be used in the practice of the method of this invention.

FIG. 2 is a sectional view on the line 2—2 in FIG. 1.

FIG. 3 is a diagrammatic plan view of apparatus that may be used in the practice of the method, including the conveyor shown in FIG. 1. The apparatus illustrated is only one example of apparatus that may be used in the practice of the invention.

FIG. 4 is an enlarged fragmentary view of a portion of a bolt showing the deposited material and the protective films thereover.

DETAILED DESCRIPTION

Reference is made to the drawing as illustrative of a procedure in accordance with the invention, where the uncured resin and the curing agent remain fluid and are protected by protective films until used.

A series of threaded fasteners or bolts 10 are supplied to the conveyor 5. Conveyor 5 comprises a pair of horizontal, laterally spaced, parallel belts 12 between which the bolts are suspended by their heads. The conveyor belts are moved by means (not shown) in the direction of the arrow. The individual bolts are supplied to the conveyor at a loading station A. At this loading station, the bolts are at ambient temperature, which may be assumed to be about 70° F. In practice, the bolts may be supported with their heads in contact with one another, although they are shown spaced apart.

Preferably, the temperature of the bolts is raised between stations A and B to about 90° F. This may be accomplished by heaters indicated at 18.

At station B, applicators 14 and 16 on opposite sides of the belt conveyor deposit controlled amounts of fluid material onto opposite sides of the threaded portions of the bolts. The fluid deposits 15 applied to one side of the bolts by the applicator 14 is a mixture of uncured resin, in this instance epoxy resin, and a film-forming ultraviolet curable material. The fluid deposits 17 applied to the opposite sides of the bolts by the applicator 16 is a mixture of a curing agent or hardener for the resin, in this instance tertiary amine, and the same film-forming ultraviolet curable material.

Applicators 14 and 16 may be of any suitable known type, and may, for example, be of the type disclosed in the prior above identified patents. The fluid deposits have a viscosity such that they flow down into the thread grooves and laterally along the thread grooves, remaining essentially at the axially located zones of deposition, which may extend for several threads along the bolt. That portion of the ultraviolet curable material in each deposit which is near or at the surface of the deposit forms a very thin continuous coating.

Heat is again applied after the bolts move beyond applicators 14 and 16, by heaters 19.

The preheat of the bolts by heaters 18 and the post heat by heaters 19 warms the bolts and the deposits and assists in the desired flow of the deposits into the thread grooves. This "lay down" of the deposits also improves the appearance of the coated bolt. Heaters 18 and 19 are optional and are used only when necessary to achieve the desired flow and "lay down". When the method is carried out in a warm environment, as in summer time, both preheat and post heat may not be needed and can be omitted.

The fasteners continue their movement on the conveyor past station C where there are ultraviolet cabinets 22 and 24 on opposite sides of the conveyor. The rate of advance of the bolts is such that the deposits on opposite sides of the bolts are exposed to high intensity radiation at station C for only a very few seconds as, for example, less then 10 seconds, and preferably between 2 and 5 seconds.

The sources of radiation may be elongated ultraviolet radiating tubes, backed by reflectors, and positioned on both sides of the conveyor beneath the conveyor belts and rated at 200 watts per inch.

The effect of the ultraviolet radiation at station C is to convert the ultraviolet curable material at the surface of the deposits 15 and 17 to a fully cured and set film or skin 26.

The films or skins formed over the deposits 15 and 17 by this process are extremely thin, flexible, dry, non-tacky and continuous, lacking any pin holes associated with prior covering methods.

The bolts then pass a final cooling station provided by blowers 40 to reduce or remove any heat build-up that may have resulted from exposure to the ultraviolet lights and to better prepare the bolts for deposit in bulk shipping containers 42 at the end of the conveyor immediately after the radiation treatment. Cooling air raises the viscosity of the deposits which gives support to and strengthens the skins so that the deposits remain intact when the bolts are discharged into the containers 42 and the bolts do not stick together.

In general, the ultraviolet curable material mixed with the resin of deposit 15 and with the curing agent of deposit 17 is made up from one or more monomers and a photoinitiator. Such ultraviolet curable material is activated to form a skin on the deposits by a photochemical reaction.

Typical monomers that may be used include chemical compounds which are classified as acrylic esters, methacrylic esters, vinyl esters, vinyl ethers, acrylic ethers, allyl esters, allyl ethers, epoxides, styrene and substituted styrenes, vinyl pyrrolidone, acrylamide and substituted acrylamides, acrylonitrile, and dienes. A particularly good monomer for the purposes of this invention is trimethylopropane triacrylate (TMPTA).

The photoinitiators can include ketones, benzophenones, aromatic ketones, Michler's ketones, benzoin ethers, alkyl aryl ketones, benzil ketals, oxime esters, halogenated thioxanthones, Onium salts, fluoborates, peroxides, azo free radical generators, and promoters like tertiary amine accelerators, organometallic complexes and mixtures of the above.

The locking resin chosen for the deposits 15 must be of a nature when cured to adhesively resist separation of two threadedly engaged members. As stated, epoxy is a particularly good resin for this purpose, a suitable example being bis-phenol A resins which are commercially available.

The curing agent selected for the deposit 17 should be one which readily effects a cure of the resin in deposit 15 when the two are mixed. A tertiary amine has been found to be an effective curing agent for an epoxy resin.

Ultraviolet radiation is preferred because of convenience, ready availability, and economy, and also because it accomplishes its purpose effectively and very quickly. However, other types of radiation may be employed, such, for example, as electron beam radiation.

As mentioned above, TMPTA has been found to be an outstanding monomer. It will not react with the resin or with the curing agent when mixed with them. However, when the deposits 15 and 17 are mixed together to cure the epoxy, as when two fasteners are threaded together, the TMPTA does coreact with the epoxy, so that that portion below the surface which does not cure in the ultraviolet light will compliment the end result. This has been proven to be true under torque tests of two threadedly engaged fasteners at temperatures as high as 400° F.

The deposits 15 and 17 of locking resin plus ultraviolet curable material and of hardener or curing agent plus ultraviolet curable material preferably have compositions by weight in the following ranges:

| Resin Deposit 15 | Hardener Deposit 17 |
| --- | --- |
| 15%–74% locking resin (A) | 15%–74% hardener (D) |
| 20%–75% monomer (B) | 20%–75% monomer (B) |
| 1%–10% photoinitiator (C) | 1%–10% photoinitiator (C) |

Sample formulations are:

| | Hardener Deposit 17 |
| --- | --- |
| Example 1 | 100 ml tertiary amine (D) |
| | 75 ml acrylate monomer (B) |
| | 3 ml aromatic hydroxy ketone (C) |
| | Resin Deposit 15 |
| | 100 ml epoxy resin (A) |
| | 35 ml acrylate monomer (B) |
| | 1.4 ml aromatic hydroxy ketone (C) |
| | Hardener Deposit 17 |
| Example 2 | 100 ml tertiary amine (D) |
| | 75 ml TMPTA (B) |
| | 3 g. thioxanthone (C) |
| | Resin Deposit 15 |
| | 400 ml epoxy resin (A) |
| | 140 ml TMPTA (B) |
| | 9.8 g. Michler's ketone (C) |

In the foregoing examples, the capital letters in parentheses following each component represents the appropriate category as described in the material immediately preceding the examples.

The method of this invention has a number of advantages over prior methods, in particular the method involving the use of a subsequently applied water base cover coat or skin. Among the advantages are:

(a) It is possible to substantially reduce the overall length of the conveyor apparatus used to practice the invention and to increase the speed of the conveyor, thereby substantially reducing production time.

(b) The need for blowers and dryers, etc. to drive off the aqueous or organic solvent in a cover coat is eliminated, reducing overall power consumption.

(c) Pin holes and imperfections in the cover coat for the deposits are no longer a problem since the generation of a skin by ultraviolet light is uniform and total. Pin holes are simply not acceptable. They permit escape of the deposits and can cause skin problems for anyone handling the parts.

(d) A cover or skin cured by ultraviolet light according to the present invention makes the deposits water and solvent proof in contrast to some other types of self-locking deposits.

(e) Since the ultraviolet curable material is mixed with the deposits rather than subsequently applied, such material covers only the deposits themselves and does not get into the spaces between the deposits where it might interfere with a successful mixing of the deposits when the fasteners are engaged.

This method lends itself readily to mass production of friction locking fasteners which may be collected at random at the end of the conveyor line immediately after being exposed to radiation. The film or skin formed on the deposits is thin, dry, flexible and non-tacky so that the randomly collected fasteners do not stick together and the locking resin and hardener are covered and well protected against displacement or loss. When one of these fasteners is engaged with a mating threaded member, the two deposits are mixed together, effecting a cure of the resin to provide a thread lock.

In the foregoing, a mass production method has been described in which the uncured fluid resin and fluid actuator or hardener are deposited on a threaded zone in side-by-side relation, each deposit including an ultraviolet curable material which when subjected to ultraviolet light forms a protective film over the deposits.

However, the invention is also applicable to mass production of threaded articles in which the resin and/or hardener may be micro-encapsulated.

It has been suggested that thread locks may be formed by suitably supporting a liquid or fluid locking material in microscopic, pressure rupturable capsules located in the thread grooves of a threaded article.

In accordance with my own prior U.S. Pat. No. 4,325,985, one or both of the resin and hardener are micro-encapsulated and deposited in a threaded zone, the deposit subsequently being spray coated with an ultraviolet curable material which is exposed to radiation to form a protective film. Some of the capsules rupture when the article is threaded into a mating threaded article to effect polymerization.

In accordance with the present invention, the material to be deposited may contain a mixture of microencapsulated uncured fluid resin in a suitable fluid hardener or polymerizing agent for the resin, and an ultraviolet curable material. The hardener, instead of the resin, may also, if desired, be microencapsulated, or both may be micro-encapsulated.

The resin, hardener, and ultraviolet curable material may be of the same material as heretofore described.

In accordance with the invention, this mixture of resin and hardener, at least one of which is micro-encapsulated, and including the ultraviolet curable material, may be serially applied to the articles as they pass an applicator station. This may be the station B in FIG. 3, where the mixture may be applied at one side of the articles 10, or at both sides. In the latter case, the fluid mixture may flow around the thread grooves to form a 360° ring. Fluidity and viscosity are preferably such as to prevent substantial flow axially across the thread grooves.

Substantially immediately after application of the fluid mixture, the mixture is exposed to a very brief radiation treatment by ultraviolet lamps. This may be at station C in FIG. 3, where ultraviolet sensitive material at the surface of the deposits is set into an extremely thin, flexible, dry, non-tacky, protective cover film. The films cover the deposits, so that the articles do not stick together. The time of exposure to ultraviolet light is the same as that described in the previous embodiment. Protected by the film is the mixture containing the resin and the hardener. Since the resin or hardener or both have been micro-encapsulated, the resin and hardener are separated from one another to prevent premature mixing and polymerization of the resin.

In U.S. Pat. No. 3,746,068 there is suggested microencapsulation of an unpolymerized resin in a fluid binder to produce a mixture suitable for application to the threads of a threaded article. The binder includes fluids or liquids such as toluene, all capable of being eliminated by evaporation, thus requiring a protracted drying period in the absence of a protective film.

In accordance with the present invention, the fluid deposit is protected by a film which is formed substantially immediately following application of the deposit, so that no protracted drying period is necessary. No binder is necessary nor is one present in the mixture. Even if both the resin and hardener are micro-encapsulated, the radiation curable material serves the purpose of holding the mixture together in a fluid slurry until the protective film is formed.

Prior U.S. Pat. No. 3,814,156 discloses a mixture of separately micro-encapsulated two part adhesives in a fluid binder, again requiring a protracted drying period before the threaded articles can be randomly accumulated without sticking.

For a more complete description of the capsules, reference is again made to my own prior U.S. Pat. No. 4,325,985 as well as the other patents disclosed herein.

When a fastener having a deposit as herein described, in which one or both the resin and hardener have been microencapsulated, is engaged in a mating threaded member, the microcapsules rupture so that the resin and hardener mix together, curing the resin to a solid state and producing a thread lock. The protective film over the deposit breaks up and "balls" up and assists in rupturing the capsules.

I claim:

1. The method of making a threaded friction locking article provided with thread locking means adapted to resist separation from a mating threaded member which comprises placing at a first location on the threaded surface of the article a first deposit comprising a fluid mixture of an uncured resin and a radiation-curable, film-forming material so that a very thin film coating of said radiation-curable, film-forming material develops at the surface of said first deposit, placing at a second location spaced circumferentially from said first location on said threaded surface a second deposit comprising a fluid mixture of a curing agent for the resin and a radiation-curable, film-forming material so that a very thin coating of the radiation-curable, film-forming material develops at the surface of said second deposit, and thereafter initiating a brief high intensity radiation of the radiation-curable film-forming material at the surfaces of said deposits to transform the same into thin, continuous, flexible, non-tacky outer protective films which cover the still fluid mixtures on the threaded surface of the article, said films being rupturable to permit intermixing of said resin and curing agent and curing of said resin.

2. The method as defined in claim 1, which comprises supporting the article with its axis vertical during deposition of the two deposits and radiation thereof, in which said deposits when deposited have a viscosity which permits flow thereof down into the thread grooves and laterally along the thread grooves while preventing substantial flow longitudinally of the article.

3. The method as defined in claim 1, wherein said radiation-curable material in each deposit includes trimethylopropane triacrylate.

4. The method as defined in claim 1, which comprises applying the deposit in the thread grooves at a temperature of about 90° F.

5. The method as defined in claim 1, in which the first deposit comprises a mixture by weight of about 15%-74% of the resin, about 20%-75% of a monomer and about 1%-10% of a photoinitiator.

6. The method as defined in claim 1, in which the second deposit comprises a mixture by weight of about 15%-74% of the curing agent, about 20%-75% of a monomer and about 1%-10% of a photoinitiator.

7. The method of mass producing articles by the method defined in claim 1, which comprises continuously advancing a series of articles horizontally through a deposit station and making the deposits in the thread grooves as the articles advance, and subjecting the deposits to ultraviolet radiation at a radiation station beyond the deposit station as the articles continue to advance.

8. The method of mass producing articles by the method defined in claim 7, which comprises collecting the finished articles at random immediately after exposure to the ultraviolet radiation.

9. The method defined in claim 8, in which said first deposit comprises a mixture by weight of about 15%–74% of epoxy resin, about 20%–75% of a trimethylopropane triacrylate, and about 1%–10% of a photoinitiator.

10. The method as defined in claim 8, in which said second deposit comprises a mixture by weight of about 15%–74% of an amine curing agent, about 20%–75% of trimethylopropane triacrylate, and about 1%–10% of a photoinitiator.

11. The method of producing a threaded article provided with thread locking means adapted to resist separation from a mating threaded article which comprises depositing a fluid lock-forming material on the threaded surface of the article to be received in the thread grooves and fill the bottoms of the thread grooves, the fluid material comprising a fluid mixture including uncured resin contained in micro-capsules, a curing agent for the resin, and a radiation-curable film-forming material, and thereafter subjecting the radiation-curable material at the surface of said deposit to radiation to transform the same into a thin, continuous, flexible, non-tacky outer protective film which covers the still fluid mixture in the thread grooves of the article, said film and micro-capsules being rupturable to permit intermixing of said resin and curing agent and curing of said resin.

12. The method as defined in claim 11, wherein the radiation-curable material includes trimethylopropane triacrylate.

13. The method as defined in claim 11, wherein said radiation-curable material comprises a monomer and a photoinitiator.

14. The method as defined in claim 13, in which the monomer is trimethylopropane triacrylate.

15. The method as defined in claim 1, in which the radiation-curable material includes a monomer and a photoinitiator, the monomer is trimethylopropane triacrylate, and the radiation-curable material is subjected to ultraviolet radiation.

16. The method of producing a threaded article provided with thread locking means adapted to resist separation from a mating threaded article which comprises depositing a fluid lock-forming material on the threaded surface of the article to be received in the thread grooves and fill the bottoms of the thread grooves, the fluid material comprising a fluid mixture of an uncured resin and a fluid curing agent for said resin, one of which is contained in micro-capsules, said mixture also including a radiation-curable film-forming material, and thereafter subjecting the radiation-curable material at the surface of said deposit to radiation to transform the same into a thin, continuous, flexible, non-tacky outer protective film which covers the still fluid mixture in the thread grooves of the article, said film and micro-capsules being rupturable to permit intermixing of said resin and curing agent and curing of said resin.

17. The method as defined in claim 1 in which the radiation curable material comprises a monomer and a photoinitiator.

* * * * *